(12) United States Patent
Yoo

(10) Patent No.: US 8,463,907 B2
(45) Date of Patent: Jun. 11, 2013

(54) SYSTEM AND METHOD FOR PERFORMANCE TEST IN OUTSIDE CHANNEL COMBINATION ENVIRONMENT

(75) Inventor: Kap Sik Yoo, Seongnam-si (KR)

(73) Assignee: Samsung SDS Co., Ltd., Seoul (KR)

( * ) Notice: Subject to any disclaimer, the term of this patent is extended or adjusted under 35 U.S.C. 154(b) by 422 days.

(21) Appl. No.: 12/444,829

(22) PCT Filed: Dec. 8, 2006

(86) PCT No.: PCT/KR2006/005327
§ 371 (c)(1),
(2), (4) Date: Sep. 16, 2009

(87) PCT Pub. No.: WO2008/044811
PCT Pub. Date: Apr. 17, 2008

(65) Prior Publication Data
US 2010/0017657 A1    Jan. 21, 2010

(30) Foreign Application Priority Data

Oct. 11, 2006 (KR) .................. 10-2006-0099083

(51) Int. Cl.
*G06F 15/173* (2006.01)
(52) U.S. Cl.
USPC ..................... 709/226; 709/224; 709/229
(58) Field of Classification Search
USPC .......................... 709/226, 224, 229
See application file for complete search history.

(56) References Cited

U.S. PATENT DOCUMENTS

| | | | |
|---|---|---|---|
| 6,148,140 A | 11/2000 | Okada et al. | |
| 6,694,288 B2 | 2/2004 | Smocha et al. | |
| 6,775,644 B2 * | 8/2004 | Myers | 702/186 |
| 6,928,477 B1 * | 8/2005 | Leymann et al. | 709/226 |
| 6,985,940 B1 * | 1/2006 | Jenkin | 709/224 |

(Continued)

FOREIGN PATENT DOCUMENTS

| | | |
|---|---|---|
| EP | 1376361 A1 | 1/2004 |
| JP | 52106246 | 9/1977 |

(Continued)

*Primary Examiner* — Firmin Backer
*Assistant Examiner* — Jonathan Bui
(74) *Attorney, Agent, or Firm* — The Webb Law Firm

(57) ABSTRACT

Provided are a system and method for a performance test in an outside channel combination environment. In an outside channel combination environment including first and second outside-affairs servers in an active-active form, first and second outside channel combination servers, and first and second network devices, a system for a performance test includes: a plurality of test lines connected to one another so that a closed circuit is formed at outputs of the first and second network devices; and at least one load generator for generating loads corresponding to outbound messages to be sent to a plurality of outside authorities, and measuring system performance, wherein: the loads generated by the load generator are sent to the second outside channel combination server via the first outside-affairs server, the first outside channel combination server, the first network device, the test lines, and the second network device, and the second outside channel combination server generates a response message corresponding to the received load, and then sends the response message to the load generator via the second network device, the test lines, the first network device, the first outside channel combination server, and the first outside-affairs server, so that system performance is measured. Thus, a performance test for transmit/receive message can be effectively performed in advance in a newly built outside channel combination environment.

10 Claims, 4 Drawing Sheets

U.S. PATENT DOCUMENTS

| | | | |
|---|---|---|---|
| 7,254,607 B2* | 8/2007 | Hubbard et al. | 709/203 |
| 2002/0032777 A1* | 3/2002 | Kawata et al. | 709/226 |
| 2004/0019659 A1* | 1/2004 | Sadot et al. | 709/219 |
| 2004/0039550 A1* | 2/2004 | Myers | 702/186 |
| 2004/0059544 A1* | 3/2004 | Smocha et al. | 702/182 |
| 2004/0100970 A1 | 5/2004 | Gerdisch et al. | |
| 2004/0199815 A1* | 10/2004 | Dinker et al. | 714/21 |
| 2005/0080887 A1 | 4/2005 | Lee et al. | |
| 2005/0172161 A1 | 8/2005 | Cruz et al. | |
| 2006/0069776 A1* | 3/2006 | Shim et al. | 709/225 |
| 2006/0224375 A1* | 10/2006 | Barnett et al. | 703/22 |
| 2006/0224731 A1 | 10/2006 | Haga et al. | |
| 2007/0121712 A1* | 5/2007 | Okamoto | 375/222 |
| 2007/0180097 A1* | 8/2007 | Roth | 709/223 |
| 2007/0291650 A1* | 12/2007 | Ormazabal | 370/244 |
| 2008/0005613 A1* | 1/2008 | Marquardt et al. | 714/7 |
| 2008/0071906 A1* | 3/2008 | Thoennes et al. | 709/224 |
| 2009/0006616 A1* | 1/2009 | Gore et al. | 709/224 |

FOREIGN PATENT DOCUMENTS

| | | |
|---|---|---|
| JP | 2002342274 A | 11/2002 |
| KR | 20000039571 A | 7/2000 |
| KR | 20040055771 A | 6/2004 |

* cited by examiner

SYSTEM AND METHOD FOR PERFORMANCE TEST IN OUTSIDE CHANNEL COMBINATION ENVIRONMENT

TECHNICAL FIELD

The present invention relates to a system and method for a performance test in an outside channel combination environment.

BACKGROUND ART

Even though the Internet is being widely used, numerous banking authorities are generally associated with a plurality of outside authorities (e.g., financial supervisory authorities, credit rating agencies, credit card companies, commercial banks, and the like) via, for example, an X.25 or TCP/IP-based private line for affairs processing. When building a system, a test associated with the outside authorities is necessary, that is, an affairs test is immediately performed following a connection test.

A conventional test method cannot systematically perform a performance test according to load levels in a test scenario since the method is unable to test a desired plurality of loads at a desired point in time.

DISCLOSURE OF INVENTION

Technical Problem

The present invention is directed to a system and method for a performance test in an outside channel combination environment which is capable of effectively performing, in advance, a performance test for an outbound/inbound message in a newly built outside channel combination system environment.

Technical Solution

One aspect of the present invention provides a system for a performance test in an outside channel combination environment comprising first and second outside-affairs servers in an active-active form, first and second outside channel combination servers, and first and second network devices, the system comprising: a plurality of test lines connected to one another so that a closed circuit is formed at outputs of the first and second network devices; and at least one load generator for generating loads corresponding to outbound messages to be sent to a plurality of outside authorities, and measuring system performance, wherein the loads generated by the load generator are sent to the second outside channel combination server via the first outside-affairs server, the first outside channel combination server, the first network device, the test lines, and the second network device, and the second outside channel combination server generates a response message corresponding to the received load, and then sends the response message to the load generator via the second network device, the test lines, the first network device, the first outside channel combination server, and the first outside-affairs server to measure system performance.

The loads generated by the load generator may be balanced in a ratio of 50:50 when they are sent to the first and second outside-affairs servers.

The loads generated by the load generator may cause a load on a web screen of the first outside-affairs server, and the web screen may automatically generate an outside request message.

The loads generated by the load generator may be sent via a path composed of the first outside-affairs server, the second outside channel combination server, the first outside channel combination server, the first network device, the test lines, the second network device, and the second outside channel combination server, and the response message generated by the second outside channel combination server may be sent via a path composed of the second network device, the test lines, the first network device, the first outside channel combination server, the second outside channel combination server, the first outside-affairs server, and the load generator.

The first and second network devices may be active and standby network devices in an active-standby form.

Another aspect of the present invention provides a system for a performance test in an outside channel combination environment comprising first and second outside-affairs servers in an active-active form, first and second outside channel combination servers, and first and second network devices, the system comprising: a plurality of test lines connected to one another so that a closed circuit is formed at outputs of the first and second network devices; at least one load generator for generating loads corresponding to inbound messages received from a plurality of outside authorities, and measuring system performance; and a load collecting/amplifying module included in the second outside channel combination server to collect and amplify the loads generated by the load generator, wherein the loads generated by the load generator are sent to the first outside-affairs server via the load collecting/amplifying module of the second outside channel combination server, the second network device, the test lines, the first network device, and the first outside channel combination server, and the first outside-affairs server generates a response message corresponding to the sent load, and sends the response message to the load generator via the first outside channel combination server, the first network device, the test lines, the second network device, and the load collecting/amplifying module of the second outside channel combination server to measure the system performance.

Still another aspect of the present invention provides a method for a performance test in an outside channel combination environment comprising first and second outside-affairs servers in an active-active form, first and second outside channel combination servers, first and second network devices, a plurality of test lines connected to one another so that a closed circuit is formed at outputs of the first and second network devices, and at least one load generator connected to the first outside-affairs server, the method comprising the steps of: (a) generating, by the load generator, loads corresponding to outbound messages to be sent to a plurality of outside authorities; (b) sending the loads generated in step (a) via a path composed of the first outside-affairs server, the first outside channel combination server, the first network device, the test lines, the second network device, and the second outside channel combination server; (c) generating, by the second outside channel combination server, a response message corresponding to the sent load; and (d) sending the response message generated in step (c) via a path composed of the second network device, the test lines, the first network device, the first outside channel combination server, the first outside-affairs server, and the load generator.

Yet another aspect of the present invention provides a method for a performance test in an outside channel combination environment comprising first and second outside-affairs servers in an active-active form, first and second outside channel combination servers, first and second network devices, a plurality of test lines connected to one another so that a closed circuit is formed at outputs of the first and second network devices, and at least one load generator connected to the second outside channel combination server, the method comprising the steps of: (a') generating, by the load generator, loads corresponding to inbound messages received from a plurality of outside authorities and sending the loads to the second outside channel combination server; (b') collecting and amplifying, by the second outside channel combination server, the loads sent in step (a'), and sending the loads via a path composed of the second network device, the test lines, the first network device, the first outside channel combination server, and the first outside-affairs server; (c') generating, by the first outside-affairs server, a response message corresponding to the sent load; and (d') sending the response message generated in step (c') via a path composed of the first outside channel combination server, the first network device, the test lines, the second network device, the second outside channel combination server, and the load generator.

Yet another aspect of the present invention provides a computer-readable recording medium having a program recorded thereon for implementing the above method for a performance test in an outside channel combination environment.

Advantageous Effects

As described above, according to the system and method for a performance test in the outside channel combination environment of the present invention, it is possible to effectively perform, in advance, a performance test for an outbound/inbound message in a newly built outside channel combination system environment.

MODE FOR THE INVENTION

Hereinafter, exemplary embodiments of the present invention will be described in detail. However, the present invention is not limited to the exemplary embodiments disclosed below, but can be implemented in various types. Therefore, the present exemplary embodiments are provided for complete disclosure of the present invention and to fully inform the scope of the present invention to those ordinarily skilled in the art.

Figure 1:
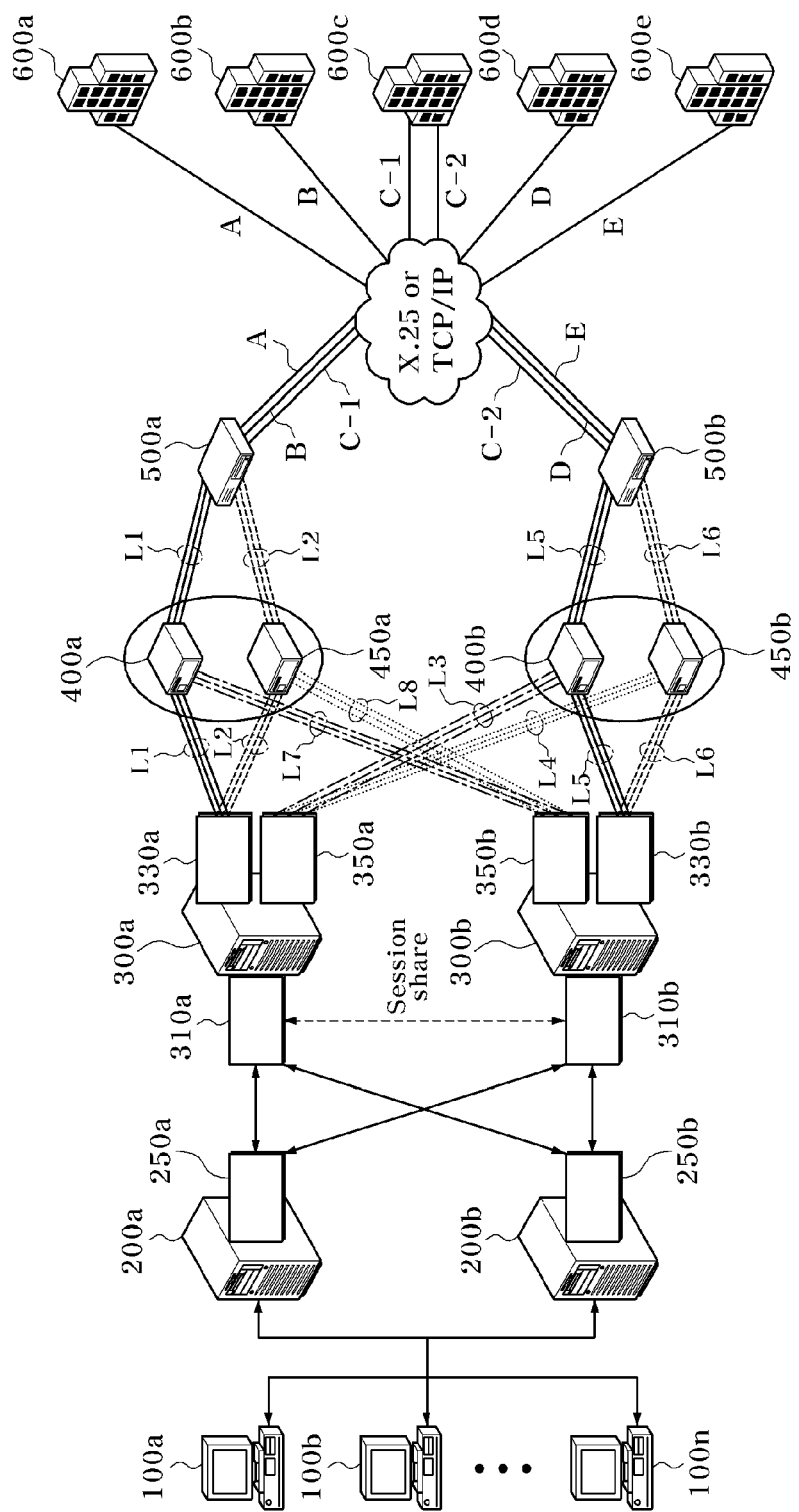
FIG. 1 is a schematic block diagram illustrating an outside channel combination environment applied to an exemplary embodiment of the present invention.

FIG. 1 is a schematic block diagram illustrating an outside channel combination environment applied to an exemplary embodiment of the present invention.

Referring to FIG. 1, the outside channel combination environment applied to an embodiment of the present invention includes a plurality of user terminals 100a to 100n, first and second outside-affairs servers 200a and 200b, first and second outside channel combination servers 300a and 300b, first active and standby network devices 400a and 450a, second active and standby network devices 400b and 450b, first and second switching devices 500a and 500b, and a plurality of outside authorities 600a to 600e.

The first and second outside-affairs servers 200a and 200b configured in an active-active form are connected to the user terminals 100a to 100n via, for example, a local area network (LAN).

The first and second outside-affairs servers 200a and 200b respectively include first and second outside-affairs processing applications (APs) 250a and 250b having the same function in order to perform outside-affairs (e.g., bank deposit/payment, credit cards, insurance, securities, and other banking transaction affairs) associated with the outside authorities 600a to 600e (e.g., financial supervisory authorities, credit rating agencies, credit card companies, and commercial banks).

The first and second outside channel combination servers 300a and 300b configured in the active-active form are connected with the first and second outside-affairs servers 200a and 200b to interwork with the same, and function to process the outside-affairs associated with the outside authorities 600a to 600e.

The first and second outside channel combination servers 300a and 300b include first and second message relaying applications 310a and 310b for relaying a transmit/receive message, i.e., an outbound/inbound message, first and second master communication applications 330a and 330b, and first and second backup communication applications 350a and 350b, respectively.

In the first and second outside channel combination servers 300a and 300b, the first and second message relaying applications 310a and 310b share information related to message processing via a session, and function to manage line connection information required for message transmission, and a transmission state.

The first master communication application 330a is connected with the first active and standby network devices 400a and 450a in an active-standby form via active lines L1 and backup lines L2, and functions to transmit and receive an outbound/inbound message between the first outside-affairs server 200a and the first active or standby network device 400a or 450a according to whether a communication error is generated in the first active and standby network devices 400a and 450a.

The first backup communication application 350a is connected with the second active and standby network devices 400b and 450b in an active-standby form via backup lines L3 and L4, and functions to transmit and receive an outbound/inbound message between the second outside-affairs server 200b and the second active or standby network device 400b or 450b according to whether a communication error is generated in the second active and standby network devices 400b and 450b when a communication error is generated in the second outside channel combination server 300b.

The second master communication application 330b is connected with the second active and standby network devices 400b and 450b via active lines L5 and backup lines L6, and functions to transmit and receive an outbound/inbound message between the second outside-affairs server 250b and the second active or standby network device 400b or 450b according to whether a communication error is generated in the second active and standby network devices 400b and 450b.

The second backup communication application 350b is connected with the first active and standby network devices 400a and 450a via backup lines L7 and L8, and functions to transmit and receive an outbound/inbound message between the first outside-affairs server 200a and the first active or standby network device 400a or 450a according to whether a communication error is generated in the first active and standby network devices 400a and 450a when a communication error is generated in the first outside channel combination server 300a.

The first active network device 400a is connected between the first master communication application 330a and the first switching device 500a via the active lines L1, and connected with the second backup communication application 350b via the backup lines L7.

The first active network device 400a functions to automatically switch from the active lines L1 connected with the first outside channel combination server 300a to the backup lines L7 connected with the second backup communication application 350b of the second outside channel combination server 300b when a communication error is generated in the first outside channel combination server 300a, or when the active lines L1 connected with the first outside channel combination server 300a fail.

The first standby network device 450a is connected between the first master communication application 330a and the first switching device 500a via the backup lines L2, and is connected with the second backup communication application 350b via backup lines L8.

The first standby network device 450a is activated when a communication error is generated in the first active network device 400a, or when the active lines L1 connected between the first active network device 400a and the first switching device 500a fail, and remains in a standby state to perform normal outside-affairs via the backup lines L2 connected between the first master communication application 330a and the first switching device 500a.

The second active network device 400b is connected between the second master communication application 330b and the second switching device 500b via the active lines L5, and is connected with the first backup communication application 350a via the backup lines L3.

The second active network device 400b functions to automatically switch from the active lines L5 connected with the second outside channel combination server 300b to the backup lines L3 connected with the first backup communication application 350a of the first outside channel combination server 300a when a communication error is generated in the second outside channel combination server 300b, or when the active lines L5 connected with the second outside channel combination server 300b fail.

The second standby network device 450b is connected between the second master communication application 330b and the second switching device 500b via the backup lines L6, and connected with the first backup communication application 350a via the backup lines L4.

The second standby network device 450b is activated when a communication error is generated in the second active network device 400b, or when the active lines L5 connected between the second active network device 400b and the second switching device 500b fail, and remains in a standby state to perform normal outside-affairs via the backup lines L6 connected between the second master communication application 330b and the second switching device 500b.

The first active and standby network devices 400a and 450a and the second active and standby network devices 400b and 450b applied to the embodiment of the present invention as described above are preferably implemented by, for example, a MegaBOX.

The first switching device 500a is connected with the first active and standby network devices 400a and 450a via the active lines L1 and the backup lines L2, and functions to automatically switch to the first standby network device 400b when a communication error is generated in the first active network device 400a, or when the active lines L1 connected with the first active network device 400a fail.

The second switching device 500b is connected with the second active and standby network devices 400b and 450b via the active lines L5 and the backup lines L6, and functions to automatically switch to the second standby network device 450b when a communication error is generated in the second active network device 400b, or when the active lines L5 connected with the second active network device 400b fail.

Preferably, the first and second switching devices 500a and 500b applied to the embodiment of the present invention as described above are implemented by, for example, a fallback switch.

The outside authorities 600a to 600e are distributed and connected to the first and second switching devices 500a and 500b using affairs channel lines A to E connected through a private-line protocol (e.g., X.25 or TCP/IP protocol). Here, the outside authority 600c is connected with the first and second switching devices 500a and 500b via dual lines C-1 and C-2.

Figure 2:
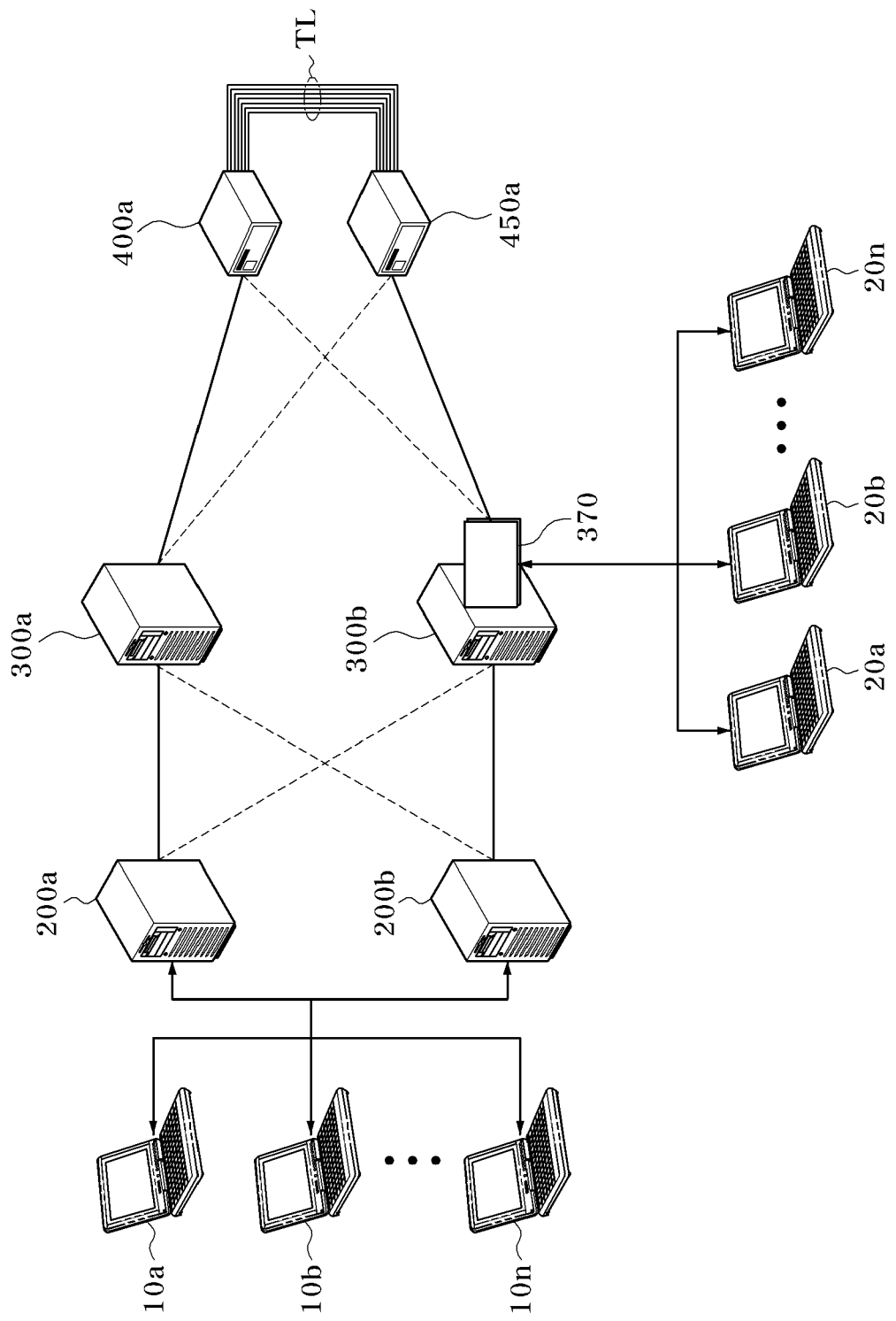
FIG. 2 is a block diagram of a system for a performance test in an outside channel combination environment according to an exemplary embodiment of the present invention.

FIG. 2 is a block diagram of a system for a performance test in an outside channel combination environment according to an exemplary embodiment of the present invention. While the description will be made on the basis of the first active and standby network devices 400a and 450a, the present invention is not limited thereto, and may be similarly applied to the second active and standby network devices 400b and 450b.

Referring to FIG. 2, the system for a performance test in an outside channel combination environment according to an embodiment of the present invention includes first load generators 10a to 10n, first and second outside-affairs servers 200a and 200b, first and second outside channel combination servers 300a and 300b, first active and standby network devices 400a and 450a, test lines TL, and second load generators 20a to 20n.

The first load generators 10a to 10n are connected to inputs of the first or second outside-affairs servers 200a or 200b. The first load generators 10a to 10n generate loads corresponding to outbound messages to be sent to a plurality of outside authorities 600a to 600e (see FIG. 1), and function to measure performance of the above-described outside channel combination system environment.

The second outside channel combination server 300b includes a load collecting/amplifying module 370 for collecting and amplifying loads generated by the second load generators 20a to 20n. The loads are for simulating inbound messages actually received from the outside authorities 600a to 600e.

The load collecting/amplifying module 370 collects the loads generated by the second load generators 20a to 20n, and amplifies the loads to a maximum load that can be transmitted via the test lines TL by changing a protocol in an identical manner as the outside authorities 600a to 600e transmitting via, for example, an X.25 protocol, so that the loads are processed in parallel in each line.

Loads intended in each test scenario are generated from the second load generators 20a to 20n in the performance test for the inbound message, and are sent to the outside channel combination system environment. This simulates load generation and transmission at the outside authorities 600a to 600e.

The test lines TL include a plurality of loopback lines in order to overcome a limit of a data amount that can be transmitted when the test is performed via, for example, X.25 lines, and are connected to outputs of the first active and standby network devices 400a and 450a, which forms a closed circuit.

The second load generators 20a to 20n are connected to the load collecting/amplifying module 370 of the second outside channel combination server 300b. The second load generators 20a to 20n function to generate loads corresponding to the inbound messages received from the outside authorities 600a to 600e, and measure the performance of the above outside channel combination system environment.

Meanwhile, the first and second outside-affairs servers 200a and 200b, the first and second outside channel combination servers 300a and 300b, and the first active and standby network devices 400a and 450a are the same as those shown in FIG. 1, and thus a detailed description thereof will be omitted.

The operation when the loads corresponding to the outbound/inbound messages are generated in the system for a performance test in the outside channel combination environment according to an embodiment of the present invention will now be described in detail.

Figure 3:
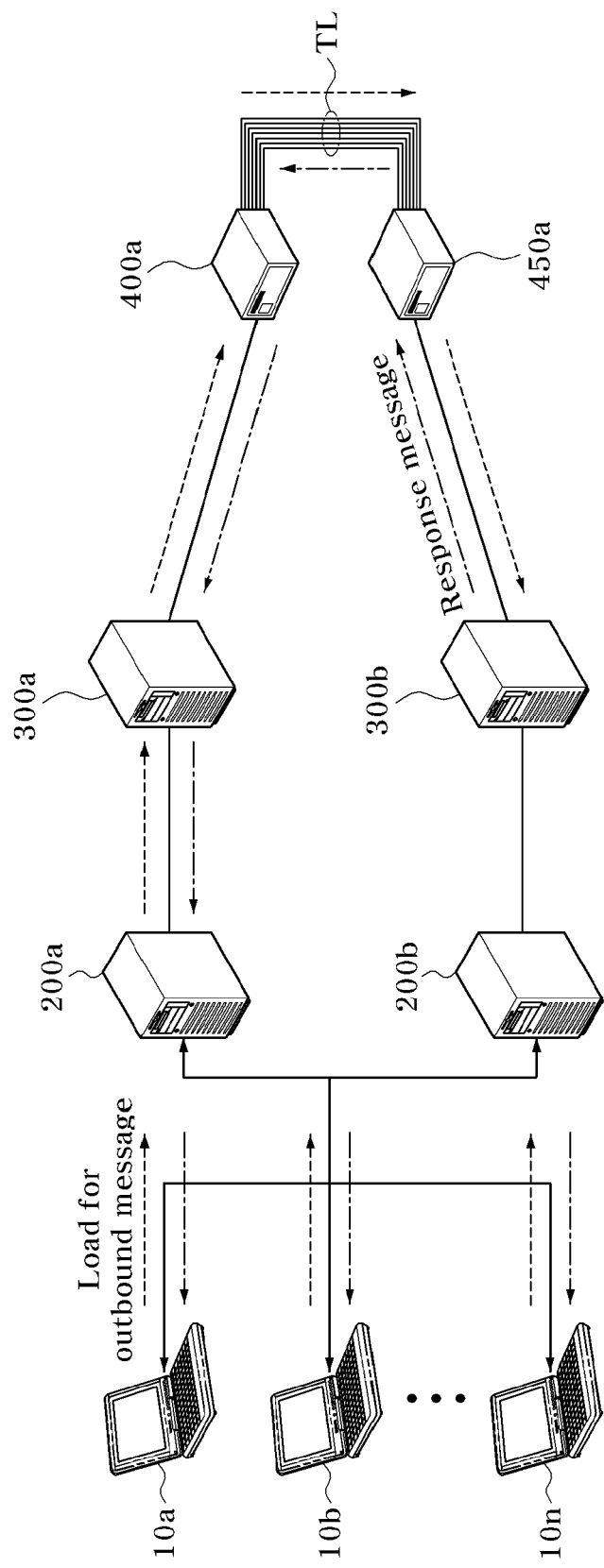
FIGS. 3 and 4 illustrate data flows when a load corresponding to an outbound/inbound message is generated in the system for a performance test in the outside channel combination environment according to an exemplary embodiment of the present invention.
Figure 4:
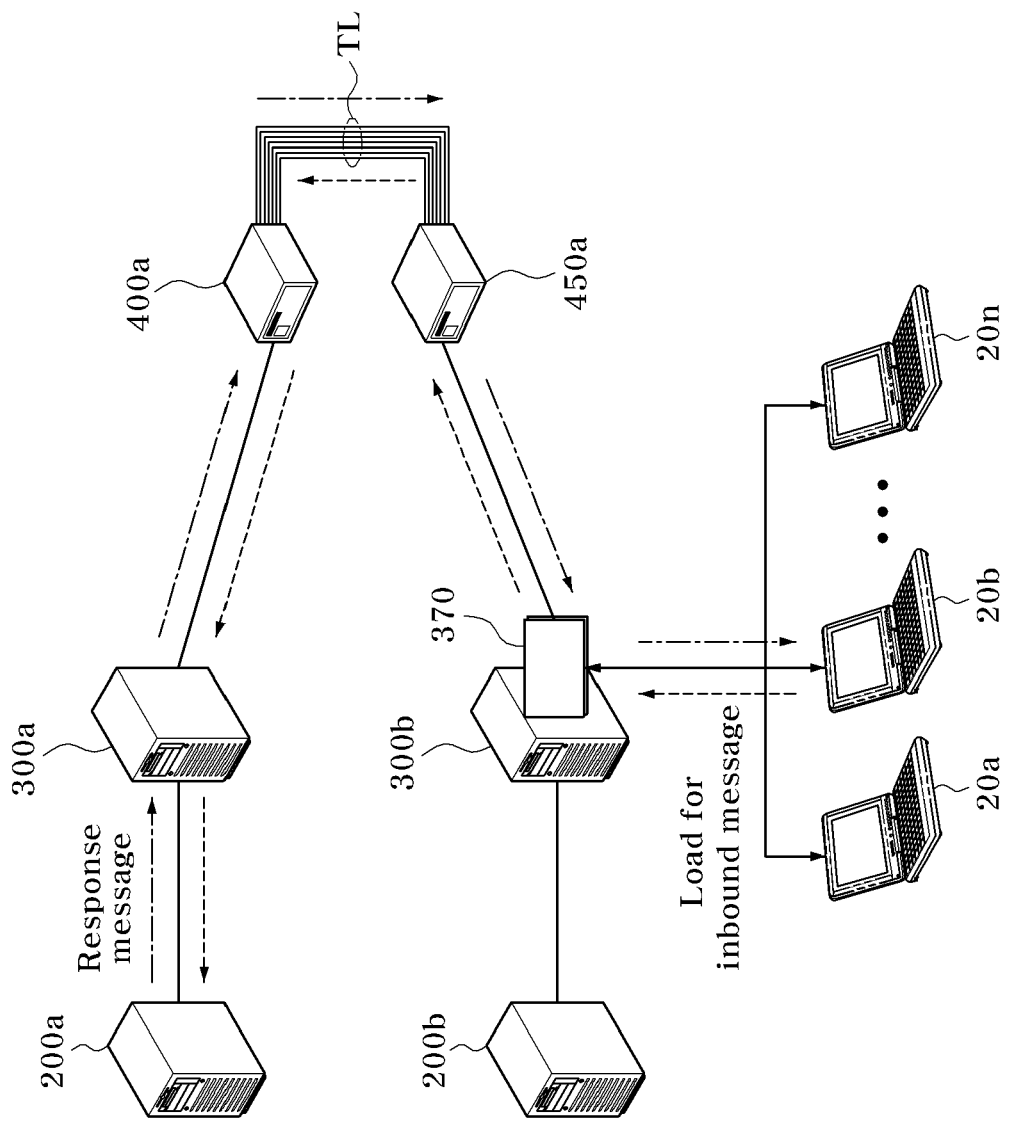

FIGS. 3 and 4 illustrate data flows when a load corresponding to an outbound/inbound message is generated in a system for a performance test in an outside channel combination environment according to an embodiment of the present invention. The outbound message refers to a message sent from the interior to the exterior, and the inbound message refers to a message sent from the exterior to the interior.

Referring to FIG. 3, when the performance test for outbound messages is performed using the system for the performance test in the outside channel combination environment according to the embodiment of the present invention, the first load generators 10a to 10n generate loads corresponding to the outbound messages to be sent to the outside authorities 600a to 600e (see FIG. 1).

The loads for outbound messages generated by the first load generators 10a to 10n cause a load on a web screen of the first outside-affairs server 200a, and the web screen automatically generates an outside request message.

The outside request message generated in the first outside-affairs server 200a is sent via a path composed of the first outside channel combination server 300a, the first active network device 400a, the test lines TL, the first standby network device 450a, and the second outside channel combination server 300b.

When receiving the outside request message, the second outside channel combination server 300b generates a response message to the outside request message and then sends it via the path composed of the first standby network device 450a, the test lines TL, the first active network device 400a, the first outside channel combination server 300a, the first outside-affairs server 200a, and the first load generators 10a to 10n.

Accordingly, the performance test for outbound messages in the newly built outside channel combination system environment can be effectively performed in advance, for example, as a test for throughput per second, an average response speed, and a maximum response speed.

Preferably, when the loads generated by the first load generators 10a to 10n are sent to the first and second outside-affairs servers 200a and 200b, the loads are balanced in a ratio of 50:50.

While in the embodiment of the present invention the outside request message generated by the first outside-affairs server 200a has been sent to the first outside channel combination server 300a directly, the present invention is not limited thereto, as the outside request message may be sent to the first outside channel combination server 300a via the second outside channel combination server 300b.

Similarly, while the response message from the first active network device 400a has been sent to the first outside channel combination server 300a directly, the present invention is not limited thereto, that is, the response message may be sent to the first outside channel combination server 300a via the second outside channel combination server 300b.

Referring to FIG. 4, when the performance test for inbound messages is performed using the system for the performance test in the outside channel combination environment according to an embodiment of the present invention, the second load generators 20a to 20n generate loads corresponding to inbound messages received from the outside authorities 600a to 600e.

The loads for inbound messages are then sent to the load collecting/amplifying module 370 of the second outside channel combination server 300b. The collecting/amplifying module 370 collects and amplifies the loads for inbound messages and then sends them via the path composed of the first standby network device 450a, the test lines TL, the first active network device 400a, the first outside channel combination server 300a, and the first outside-affairs server 200a.

When receiving the loads for inbound messages, the first outside-affairs server 200a generates a response message to the loads for the inbound messages and sends it via the path composed of the first outside channel combination server 300a, the first active network device 400a, the test lines TL, the first standby network device 450a, the second outside channel combination server 300b, and the second load generators 20a to 20n.

Accordingly, the performance test for the inbound messages in the newly built outside channel combination system environment can be effectively performed in advance, for example, as a test for throughput per second, an average response speed, and a maximum response speed.

Meanwhile, the method for the performance test in the outside channel combination environment according to an embodiment of the present invention can be implemented as a computer-readable code in a computer-readable recording medium. The computer-readable recording medium may be any recording device for storing computer-readable data.

Examples of the computer-readable recording medium include a read only memory (ROM), a random access memory (RAM), a CD-ROM, a magnetic tape, a hard disk, a floppy disk, a mobile storage device, a non-volatile memory (e.g., a Flash Memory), an optical data storage device, and a carrier wave (e.g., transmission via the Internet).

The computer-readable recording medium may be distributed to computer systems interconnected via a computer communication network, and the method may be stored and executed as a code in the recording medium.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A system for a performance test in an outside channel combination environment comprising first and second outside-affairs servers in an active-active form, first and second outside channel combination servers, and first and second network devices, the system comprising:
   a plurality of test lines connected to one another so that a closed circuit is formed at outputs of the first and second network devices; and
   at least one load generator connected to an input of the first or second outside-affairs servers for generating loads corresponding to outbound messages to be sent to a plurality of outside authorities, and measuring system performance, wherein the loads generated by the load generator are sent to the second outside channel combination server via the first outside-affairs server, the first outside channel combination server, the first network device, the test lines, and the second network device, and the second outside channel combination server generates a response message corresponding to the received load, and then sends the response message to the load generator via the second network device, the test lines, the first network device, the first outside channel combination server, and the first outside-affairs server to measure system performance.

2. The system according to claim 1, wherein the loads generated by the load generator are balanced in a ratio of 50:50 when they are sent to the first and a second outside-affairs servers.

3. The system according to claim 1, wherein the loads generated by the load generator generates a load on a web screen of the first outside-affairs server, and the web screen automatically generates an outside request message.

4. The system according to claim 1, wherein the first and second network devices are active and standby network devices in an active-standby form.

5. A system for a performance test in an outside channel combination environment comprising first and second outside-affairs servers in an active-active form, first and second outside channel combination servers, and first and second network devices, the system comprising:
  a plurality of test lines connected to one another so that a closed circuit is formed at outputs of the first and second network devices;
  at least one load generator connected to an input of the first or second outside affairs servers for generating loads corresponding to inbound messages received from a plurality of outside authorities, and measuring system performance; and
  a load collecting/amplifying module included in the second outside channel combination server to collect and amplify the loads generated by the load generator, wherein the loads generated by the load generator are sent to the first outside-affairs server via the load collecting/amplifying module of the second outside channel combination server, the second network device, the test lines, the first network device, and the first outside channel combination server, and
  the first outside-affairs server generates a response message corresponding to the sent load, and sends the response message to the load generator via the first outside channel combination server, the first network device, the test lines, the second network device, and the load collecting/amplifying module of the second outside channel combination server to measure the system performance.

6. The system according to claim 5, wherein the first and second network devices are active and standby network devices in an active-standby form.

7. A method for a performance test in an outside channel combination environment comprising first and second outside-affairs servers in an active-active form, first and second outside channel combination servers, first and second network devices, a plurality of test lines connected to one another so that a closed circuit is formed at outputs of the first and second network devices, and at least one load generator connected to the first outside-affairs server, the method comprising the steps of:
  (a) generating, by the load generator, loads corresponding to outbound messages to be sent to a plurality of outside authorities;
  (b) sending the loads generated in step (a) via a path composed of the first outside-affairs server, the first outside channel combination server, the first network device, the test lines, the second network device, and the second outside channel combination server;
  (c) generating, by the second outside channel combination server, a response message corresponding to the sent load; and
  (d) sending the response message generated in step (c) via a path composed of the second network device, the test lines, the first network device, the first outside channel combination server, the first outside-affairs server, and the load generator.

8. The method according to claim 7, wherein the loads generated in step (a) are balanced in a ratio of 50:50 when they are sent to the first and a second outside-affairs servers, in step (b).

9. A method for a performance test in an outside channel combination environment comprising first and second outside-affairs servers in an active-active form, first and second outside channel combination servers, first and second network devices, a plurality of test lines connected to one another so that a closed circuit is formed at outputs of the first and second network devices, and at least one load generator connected to the second outside channel combination server, the method comprising the steps of:
  (a') generating, by the load generator, loads corresponding to inbound messages received from a plurality of outside authorities and sending the loads to the second outside channel combination server;
  (b') collecting and amplifying, by the second outside channel combination server, the loads sent in step (a'), and sending the loads via a path composed of the second network device, the test lines, the first network device, the first outside channel combination server, and the first outside-affairs server;
  (c') generating, by the first outside-affairs server, a response message corresponding to the sent load; and
  (d') sending the response message generated in step (c') via a path composed of the first outside channel combination server, the first network device, the test lines, the second network device, the second outside channel combination server, and the load generator.

10. A non-transitory computer-readable recording medium having a program recorded thereon for implementing a method according to any one of claims 7 to 9.

* * * * *

UNITED STATES PATENT AND TRADEMARK OFFICE
CERTIFICATE OF CORRECTION

PATENT NO.       : 8,463,907 B2
APPLICATION NO.  : 12/444829
DATED            : June 11, 2013
INVENTOR(S)      : Kap Sik Yoo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 410 days.

Signed and Sealed this
Eighth Day of September, 2015

Michelle K. Lee
*Director of the United States Patent and Trademark Office*